United States Patent [19]

Kaminski et al.

[11] Patent Number: 4,753,215
[45] Date of Patent: Jun. 28, 1988

[54] BURNER FOR LOW PROFILE INPINGEMENT OVEN

[75] Inventors: Daniel S. Kaminski; George L. Csadenyi, both of Fort Wayne, Ind.

[73] Assignee: Lincoln Foodservice Products, Inc., Fort Wayne, Ind.

[21] Appl. No.: 3,126

[22] Filed: Jan. 14, 1987

[51] Int. Cl.⁴ ............................................. F24C 15/32
[52] U.S. Cl. ...................... 126/21 A; 34/223; 99/443 C; 99/475; 99/477; 432/145; 431/171
[58] Field of Search .............. 431/171, 350; 126/21 A; 99/386, 443 R, 443 C, 474, 475, 477; 34/160, 223, 231; 432/176, 194, 199, 159, 121, 136, 144, 145

[56] References Cited

U.S. PATENT DOCUMENTS

| | | | |
|---|---|---|---|
| 2,908,234 | 10/1959 | Naylor | 126/21 A |
| 3,437,085 | 3/1967 | Perry | 126/21 A |
| 3,659,518 | 5/1972 | Porter | 99/386 |
| 3,684,424 | 8/1972 | Zink et al. | 431/114 |
| 3,869,249 | 3/1975 | Prische | 432/121 |
| 3,987,718 | 10/1976 | Lang-Ree et al. | 99/386 |
| 3,991,737 | 11/1976 | Del Fabbro | 126/21 A |
| 4,457,219 | 7/1984 | Henke | 126/21 A |
| 4,462,383 | 7/1984 | Henke et al. | 126/21 A |
| 4,471,750 | 9/1984 | Burtea | 126/21 A |
| 4,556,043 | 12/1985 | Bratton | 126/21 A |
| 4,648,377 | 3/1987 | Van Camp | 126/21 A |

FOREIGN PATENT DOCUMENTS 2351072 10/1973 Fed. Rep. of Germany .
63312 4/1975 Switzerland .

OTHER PUBLICATIONS

Brochure by Wayne Home Equipment Division, The Scott & Fetzer Co., for models P250AF, P250AF-EP, P250AF-DI, Gas Burner.

Primary Examiner—Margaret A. Focarino
Attorney, Agent, or Firm—Jeffers, Hoffman & Niewyk

[57] ABSTRACT

A food preparation apparatus including a cooking chamber having a pair of openings in two opposite facing walls thereof. A conveyor extends through the side wall openings in the chamber for conveying a food product through the chamber. First and second pairs of impingement finger ducts are provided for forming a plurality of columnated air jets and for impinging the jets against discreet points of a food product supported on the conveyor. A first one of each of said pairs of finger ducts is disposed above the conveyor and a second one of each of said pairs of finger ducts is disposed below the conveyor. First and second plenums, each of which has a fan respectively associated therewith, supply air to the finger ducts. A single burner is associated with the plenums for simultaneously supplying thermal energy to both plenums. The burner includes a first adjustable baffle for apportioning the thermal energy between the two plenums. The burner includes a second baffle located in the return air stream forwardly of the burner flame to generate a negative pressure zone and draw the flame forwardly, away from the back wall of the burner.

18 Claims, 3 Drawing Sheets

BURNER FOR LOW PROFILE INPINGEMENT OVEN

BACKGROUND OF THE INVENTION

This invention relates to food preparation ovens and in particular to food preparation ovens for preparing pizza and similar types of food products. Specifically the invention relates to an impingement oven wherein food products are baked or cooked by means of jets of hot gaseous fluid such as hot air and wherein the hot air jets are impinged directly upon localized areas of the food products.

In the fast food restaurant business, it is both important that food is prepared very quickly and that the amount of kitchen space required for food preparation is minimized so that the productivity per square foot of kitchen floor space is maximized. It is, therefore, desired to provide an efficient compact oven to thereby maximize the productivity of restaurant kitchen floor space.

Advances have been made in the speed at which fast foods such as pizzas may be prepared by providing impingement ovens wherein a conveyor transports food products through an oven cavity. A plurality of duct fingers are disposed above and below the conveyor for forming a plurality of columnated jets of heated air and for impinging the jets directly against discreet points of the food products as they travel slowly through the oven cavity. Such ovens generally include a single burner for heating the air and a single fan for distributing the air through a plenum to the impingement fingers. The time required for preparing food products in such impingement ovens is substantially less than the time required for preparing food products in conventional prior art convection ovens. U.S. Pat. Ser. No. 4,556,043, which is assigned to the assignee of the present invention, discloses such an impingement oven which has been commercially very successful.

It is important in these types of impingement ovens that the velocity of the impingement air jets is sufficiently high to cause rapid thermal energy transfer to the food products. Furthermore, it is important to provide proper air pressure distribution in the plenum and the impingement fingers to generate an even flow of air through the impingement fingers thereby forming evenly distributed impingement jets.

In conventional impingement ovens, the air, after its distribution through the plenum and the impingement fingers, flows back to the fan by way of the top, bottom, and sides of the oven. Some of the air escapes from the oven by way of the openings in the side walls of the oven through which the conveyor extends. It is therefore desired to provide an impingement oven wherein the return air flows through the center of the oven. It is furthermore desired to provide an impingement oven of reduced height so that a greater number of ovens may be stacked on top of each other than was possible with prior art ovens to increase the productivity of the kitchen floor space without sacrificing food preparation time or food quality.

In impingement ovens, it is necessary to provide a large air mass flow rate to maximize thermal energy transfer. Axial fans have been commonly used in impingement ovens because of their superior air movement characteristics since they provide high velocity, low pressure air flow. The height of prior art impingement ovens has been dictated by the size of the axial fans which have been used with such ovens. Therefore, one potential approach to reducing the oven height is to use multiple fans, whereby each fan would have a smaller diameter than the single fan which is used with prior art impingement ovens. However, conventionally, the burners used in impingement type ovens have been designed so that a burner can only supply thermal energy to a single air plenum and a single fan. Therefore, if burners of conventional design were used, multiple fan impingement ovens would require multiple burners. This, of course, would entail considerable cost for supplying multiple burners as well as a complex control system to control such multiple burners. It is, therefore, desired to provide an impingement oven which uses multiple fans but only a single burner.

SUMMARY OF THE INVENTION

The present invention overcomes the disadvantages of the above-described prior art impingement ovens by providing an improved oven therefor.

The invention, in one form thereof, comprises a food preparation oven including a cooking chamber and a conveyor for conveying a food product through the chamber. A plurality of impingement fingers are disposed in the chamber for forming a plurality of columnated jets of air and for impinging the jets against discreet points of a food product supported on the conveyor. A plurality of plenums are provided for supplying air to the duct fingers. Each of the plenums has an axial fan associated therewith for supplying air to the plenum. A single burner supplies thermal energy to all of the plenums. The burner is adjustable to provide for the proper proportional distribution of thermal energy to each plenum.

The oven of the present invention, in one form thereof, further comprises a cooking chamber including a pair of openings located in opposite facing side walls thereof and a conveyor which extends through the side wall openings and oven cavity for conveying food products through the oven chamber. Two pairs of duct fingers are provided, each pair including one duct finger disposed above the conveyor and one duct finger disposed below the conveyor. Two plenums are provided and each pair of duct fingers is connected respectively to one of these plenums. Two axial fans supply air to the respective plenums and its associated pair of duct fingers. The air, after it exits from the duct fingers and impinges upon the food products, returns to the fans primarily centrally through the oven and the space between the ducts from the front to the back of the oven. The oven includes a single gas burner which is arranged so that the burner flame exits from the burner intermediate the two plenums whereby the thermal energy from the gas burner is distributed evenly between the two plenums. The burner includes an adjustable burner baffle whereby the burner flame may be deflected to divide its thermal energy equally between the two plenums. The burner also includes a fixed baffle arranged at the front of the burner to create a negative pressure zone thereby insuring that the flame is directed forwardly toward the plenums and away from the rear wall of the oven.

One advantage of the present invention is that it enables reduction of the height of an impingement oven while providing increased impingement jet velocity and improved baking performance.

Another advantage of the present invention is the use of a single burner to supply multiple plenums whereby the oven is economical to manufacture.

A further advantage of the present invention is that by using a single burner with an adjustable baffle, the thermal energy generated by the burner may be provided in selected proportions to multiple plenums.

Yet another advantage of the present invention is that, by providing a baffle for the burner to generate a negative pressure zone to draw the flame forwardly in the oven, the burner flame is prevented from unduly heating up the oven rear wall, thus eliminating warping problems and excessive heat transfer through the oven back wall.

The present invention, in one form thereof, comprises a food preparation oven including a cooking chamber and a conveyor for supporting food products and for transporting the food products through the chamber. A plurality of air impingement fingers are disposed in the chamber for forming a plurality of columnated jets of air and for impinging the jets against discreet points of food products supported on the conveyor. A plurality of plenums are operatively associated with the fingers and a plurality of fans are operatively associated with the plenums for supplying air to the plenums. A single only burner is positioned to heat the air which is supplied to both plenums, the burner including an air apportioning baffle for selectively apportioning the thermal energy supplied by the burner to the plenums.

The present invention, in one form thereof, further provides a food preparation oven comprising a cooking chamber and a supporting device arranged therein to support food products in the chamber. A plurality of air impingement fingers are disposed in the chamber for forming a plurality of columnated jets of air and for impinging the jets against discreet points of the food products supported in the chamber. A plurality of plenums are operatively associated with the plurality of fingers. An air moving means is operatively associated with each of the plurality of plenums to supply air thereto. A single only burner supplies thermal energy to the air which is supplied to the plenums.

The present invention, in one form thereof, still further comprises a food preparation apparatus including a cooking chamber which has a pair of openings arranged respectively in two opposite facing walls thereof. A conveyor is disposed in the chamber to convey a food product through the chamber and extends through the pair of openings. First and second pairs of impingement ducts are provided for forming a plurality of columnated air jets and for impinging the jets against discreet points of a food product supported on the conveyor. A first one of each of the pairs of ducts is disposed above the conveyor and a second one of each of the pairs of ducts is disposed below the conveyor. First and second plenums are respectively operatively associated with the first and second pairs of impingement ducts for supplying air thereto. First and second fans are respectively operatively associated with the plenums and a single only burner is operatively associated with both the first and second plenums for heating the air supplied to the impingement ducts. The burner includes a first baffle for deflecting the burner flame to thereby apportion the thermal energy of the burner between the first and second plenums. The burner also includes a second baffle positioned in the path of return air which flows to the plenums, whereby a negative pressure zone is generated forwardly of the flame of the burner to draw the flame toward this zone.

It is an object of the present invention to provide an oven of reduced height and improved baking characteristics.

It is a further object of the present invention to provide an oven of reduced height wherein multiple fans are used together with a single burner.

Still another object of the present invention is to provide an oven wherein the thermal energy generated by a single burner may be selectively apportioned between multiple plenums.

A still further object of the present invention is to provide a low profile oven including multiple plenums and a single burner, wherein the burner includes an adjustable baffle which deflects the burner flame to apportion the thermal energy of the burner in selected proportions between the two plenums.

Yet a further object of the present invention is to provide a low profile oven including multiple plenums and a single burner, wherein the burner includes a baffle for generating a low pressure zone to draw the burner flame toward the low pressure zone and away from the walls of the oven.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings, wherein.

Corresponding references characters indicate corresponding parts throughout the several views of the drawings.

Figure 1:
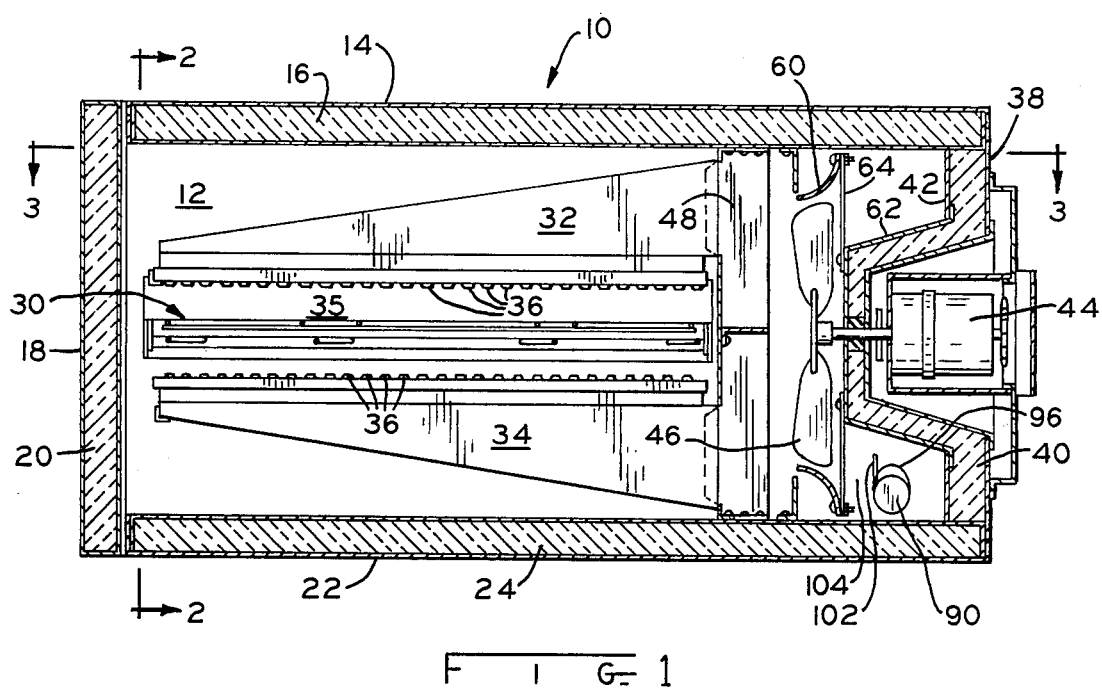
FIG. 1 is a cross sectional side view of an impingement oven incorporating a preferred embodiment of the present invention.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1-4, an impingement oven 10 is shown which includes an oven cavity 12 and a top wall 14. Top wall 14 is insulated with a layer of insulation 16 which is located between the inner and outer panels of wall 14. The front wall of oven 10 is indicated at 18 and includes a layer of insulation 20. Preferably front wall 18 includes a door (not shown) including a window (not shown). Bottom 22 of oven 10 includes a layer of insulation 24 disposed between the inner and outer panels of bottom 22. Sides 26 and 27 of oven 10 similarly include layers of insulation between the inner and outer panels thereof.

Side walls 26 and 27 respectively include apertures 23 and 25 therein through which a conveyor 30 extends, whereby food products may be placed on conveyor 30 so that they are transported through opening 23 in wall 26 into oven cavity 12 to be baked therein. The food products leave oven cavity 12 through opening 25 in opposite side wall 27 so that the food products may be removed from conveyor 30. The details of the construction of conveyor 26 do not form a part of the instant invention, and are further described in U.S. Pat. No. 4,462,383, which is assigned to the assignee of the instant application, which patent is incorporated herein by reference.

Referring further to FIGS. 1-4, oven 10 is provided with a plurality of finger ducts 32a and 32b, 34a and 34b. Finger ducts 32a and 32b are located above conveyor 30 and finger ducts 34a and 34b are located below conveyor 30 so that a space 35 is provided between finger ducts 32 and 34 in which conveyor 30 is disposed. In the disclosed embodiment, a total of four finger ducts 32a, 32b, 34a, and 34b are provided, two of which are located above conveyor 30 and two of which are located below conveyor 30. However, more or fewer finger ducts could be provided, as desired. Each of the finger ducts 32 and 34 includes a plurality of apertures 36 for forming a plurality of well-defined, high velocity air jets for impingement upon localized areas of a food product supported on conveyor 30 to thereby heat the food product. The specific construction of fingers 32 and 34 forms no part of the present invention and is more fully described in U.S. Pat. No. 4,154,861, which patent is incorporated herein by reference.

Figure 2:
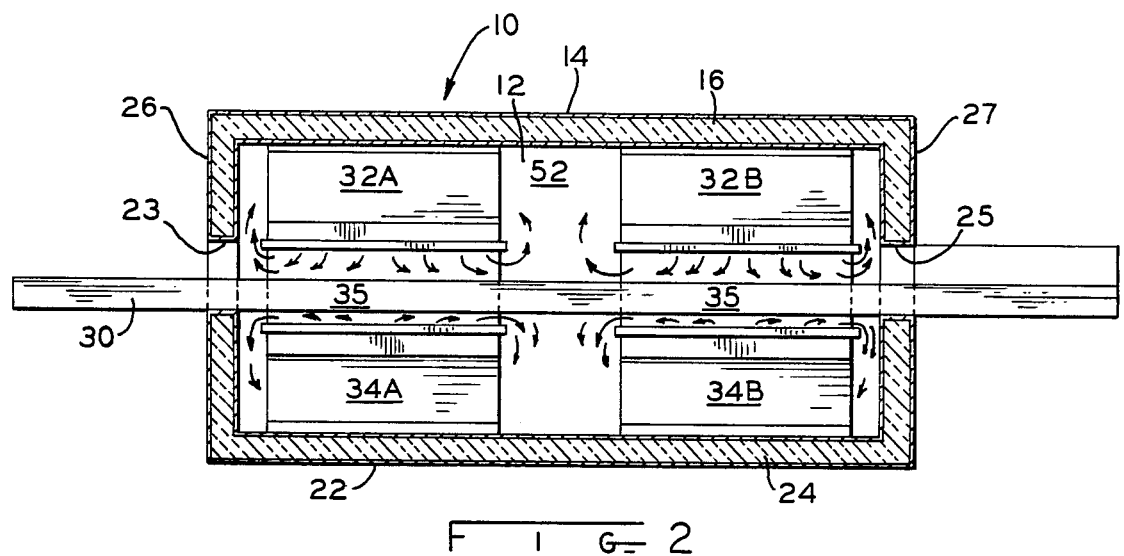
FIG. 2 is a cross sectional, front elevational view of the oven taken along line 3—3 of FIG. 1.
Figure 3:
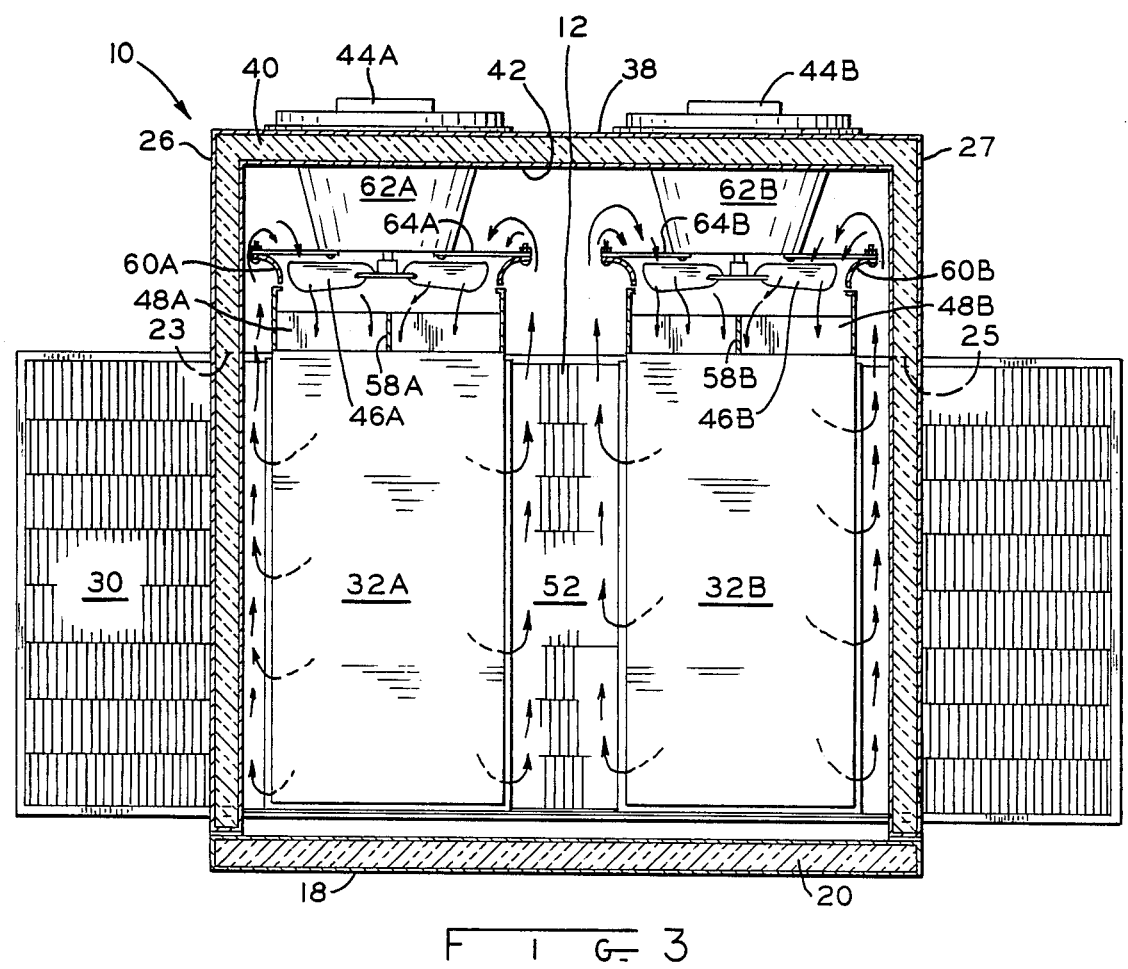
FIG. 3 is a cross sectional top plan view of the oven taken along line 3—3 of FIG. 1.
Figure 4:
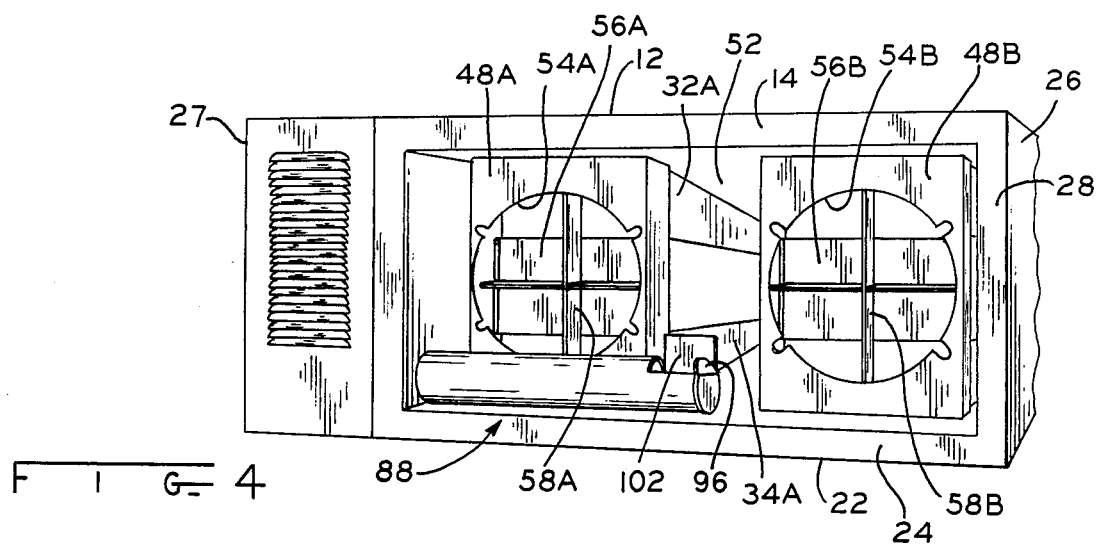
FIG. 4 is a perspective rear view of the oven of FIG. 1 with the fans and the back wall of the oven removed.

Oven 10 also includes an outer back panel 38 and an inner back panel 42 between which insulation 40 is located. Two electric motors 44a and 44b are mounted on the back panel and rotatably drive a pair of axial fans 46a and 46b which are respectively mounted behind and in alignment with a pair of plenums 48a and 48b. Plenums 48a and 48b are connected respectively to a pair of upper and lower finger ducts 32a, 34a, and 32b, 34b for supplying air thereto. Thus, as best seen in FIGS. 2 and 3, an upper finger duct 32a and a lower finger duct 34a are connected to a plenum 48a whereby a motor 44a and a fan 46a supply air through a plenum 48a and an aperture 54a therein so that the air will flow through apertures 36a and fingers 32a and 34a onto food products located on conveyor 30. As best seen in FIG. 2, a pair of baffles 58a and 58b are vertically disposed in plenums 48a and 48b to straighten the air as it flows from the axial fans 46a and 46b through plenums 48a and 48b. Baffles 58a and 58b may be secured to plenum front panels 56a and 56b. Similarly, an air supply system supplies air to the adjacent finger ducts 32b and 34b associated with plenum 48b. Air will return from oven cavity 12 through space 35 between fingers 32a, 32b, 34a, and 34b, and along outside walls 14, 22, 26 and 27 of oven 10 to flow back to axial fans 46a and 46b. The air is then heated, as further described hereinafter, and is forced back through plenums 48a and 48b and into the respective fingers 32a, 32b, 34a, and 34b.

A shroud 60 is also provided for each fan 46, to smooth out the flow of air through fans 46. Shrouds 60 are secured to frusto-conically-shaped mounts 62 by means of brackets 64a and 64b.

A more complete description of oven 10 and the air flow system therefor is described in U.S. patent application Ser. No. 07/003223 filed on even date with the instant application and assigned to the assignee of the instant invention, which application is incorporated herein by reference.

Referring now to FIGS. 4 and 5-7, the burner system for the oven is shown. A very important aspect of the invention is that only a single burner assembly 70 is provided to supply thermal energy to both plenums 48a and 48b. Burner assembly 70 is conventional except for the burner sleeve assembly 88 as discussed hereinafter. Burner assembly 70 includes a conventional squirrel cage blower 72 which is driven by an electric motor 74. Burner assembly 70 further includes a manifold assembly 76 and a gas orifice 78. Manifold assembly 76 is connected to a suitable supply of gas (not shown). Blower 72 and manifold assembly 76 are supported by a mounting plate 80 which also supports a venturi assembly 82 and an igniter assembly 84 for igniting the gas supplied through manifold assembly 76. A venturi assembly box 86 is provided for venturi assembly 82 whereby the ignited gas enters an aperture 87 in burner sleeve assembly 88. Burner sleeve assembly 88 includes a mounting plate 89 for securing mounting plate 80 to venturi assembly box 86.

Figure 5:
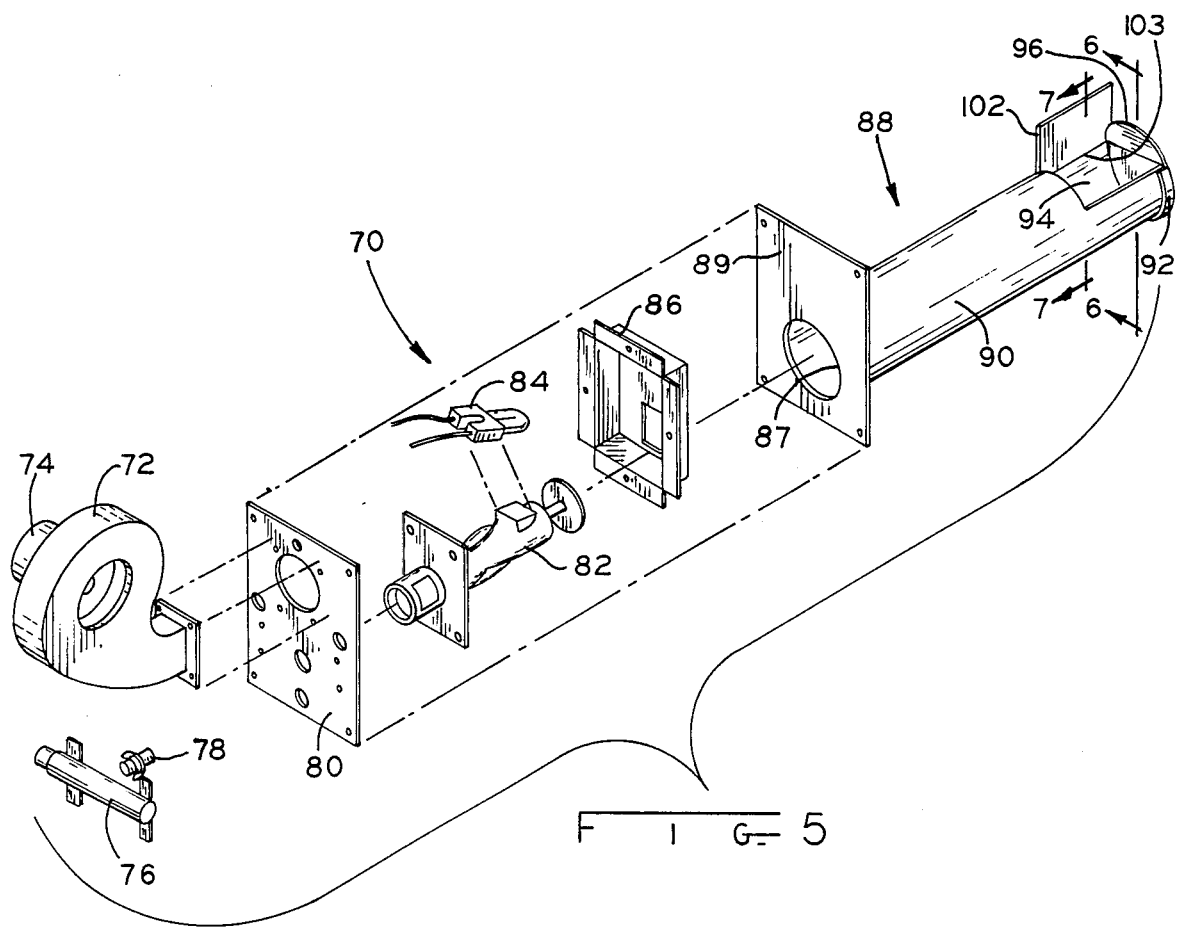
FIG. 5 is an exploded perspective view of the burner assembly of the oven of FIG. 1.
Figure 6:
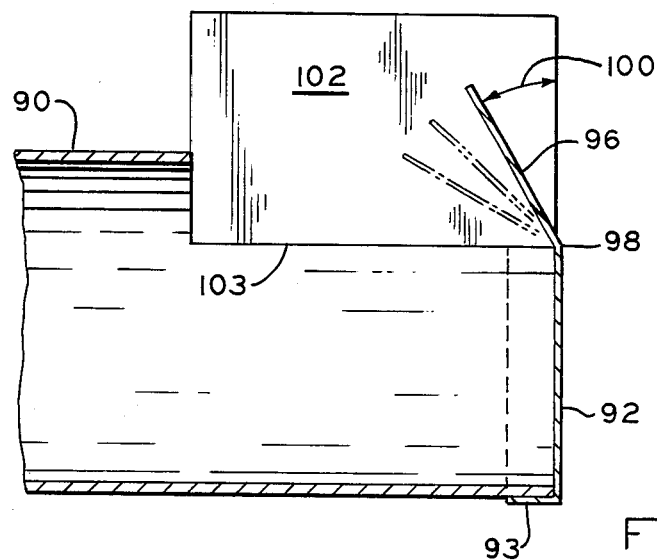
FIG. 6 is a partial sectional view of the outer housing tube and end cap of the burner taken along lines 6—6 of FIG. 5.

Burner sleeve assembly 88 includes a burner sleeve 90 having an end cap 92 which has an annular flange 93 secured thereto by interference fit, spot welding or the like. Burner sleeve 90 is provided with a flame aperture 94 through which a flame exits from the burner sleeve 90. End cap 92 includes a deflecting baffle 96 as best seen in FIGS. 5 and 6. Deflecting baffle 96 comprises a planar tab member which is bent at an angle 100 at bending line 98 with respect to the vertical plane. Angle 100 is adjustable by selectively bending tab 96 to a greater or lesser extent as shown in dotted lines in FIG. 6. Thus, a flame of burning gas formed by burner sleeve assembly 88 will be deflected by deflecting baffle 96 to an extent depending upon the deflection angle 100 of baffle 96. It should be noted that, if baffle 96 were not provided, the flame exiting from flame aperture 94 in burner sleeve 90 would be directed primarily toward plenum 48b, thereby starving thermal energy from plenum 48a. In the disclosed embodiment, it is desired to have equal amounts of thermal energy supplied to both plenums 48a and 48b. In that arrangement, angle 100 is preferably in the range of 30°-45° for best operation of the oven. Baffle 96 may be adjusted after assembly of the oven to insure substantially equal temperatures of the air impingement jets formed by fingers 32a, 32b, 34a, and 34b. It should also be noted that by the provision of baffle 96, temperature zoning in oven 10 may be provided by adjustment of baffle 96. Thus, the thermal energy generated by burner assembly 70 may be selectively apportioned between plenums 48a and 48b as desired. Therefore, the amount of thermal energy impinged by the pair of duct fingers 32a and 34a upon food products carried by conveyor 30, as compared to the thermal energy impinged by the pair of duct fingers 32b and 34b upon food products carried by conveyor 30, may be varied. Thus, temperature zones could be provided in the oven for varying the baking characteristics of the oven. It might be desired, by way of example, to heat a food product slowly as it first enters the oven, and after this, to heat the food product more rapidly as it travels further through the oven. By the adjustment of baffle 96, such zoning could be easily accomplished.

Furthermore, by providing a different operating speed for each of fans 52a and 52b, the velocity of the air flowing from impingement fingers 32a, 34a, and 32b, 34b, could also be varied. Conversely, it may be desired to first maximize heat transfer to food products and then to decrease heat transfer to the food products as they travel through the oven, depending upon the food products being prepared. By thus varying the oven air flow pattern, further zoning for adjusting the baking characteristics of the oven could be provided. Thus, the oven is versatile and may be adjusted to provide the proper baking cycle for the preparation of various types of foods.

Figure 7:
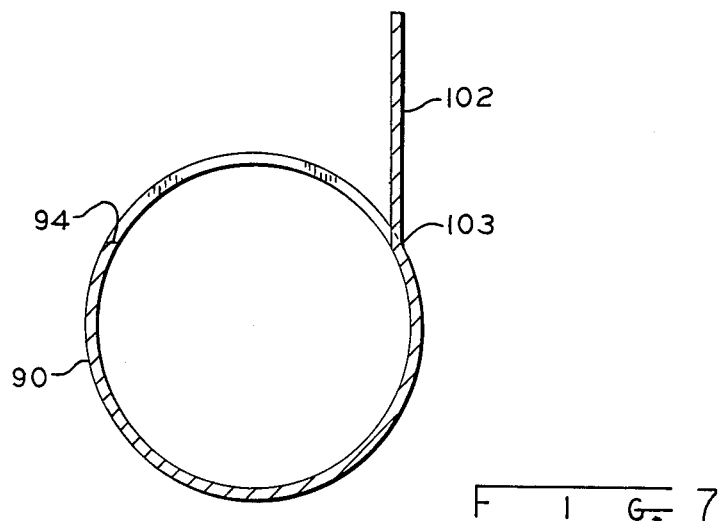
FIG. 7 is an enlarged end view of the burner sleeve tube taken along line 7—7 of FIG. 5.

Another important aspect of the invention is the provision of a diverting baffle 102 for burner assembly 70. Diverting baffle 102 is secured to burner sleeve 90 in any suitable manner such as, for instance, by welding or by bending the struck out material from aperture 94 at bending line 103 and arranging it as a planar tab 102 as best seen in FIGS. 6 and 7. It should be noted by reference to FIGS. 1, 4, 5 and 7 that diverting baffle 102 is located forwardly of flame aperture 94. Furthermore, baffle 102 is located in the air stream which returns from oven cavity 12 through space 52 between the respective duct fingers 32a, 32b, and 34a, 34b and plenums 48a and 48b. Thus, the position of baffle 102 is perpendicular to the flow of return air and thereby, by Bernoulli's principle, creates a negative pressure zone forwardly of flame aperture 94. Therefore, as the flame exits from aperture 94, it will be drawn toward zone 104 and thereby be diverted away from back wall 42. Thus, undesirable spot heating and warping of back wall panels 42 and 38 is prevented by the very simple expedient of providing a diverting baffle 102.

In operation, food products are placed on conveyor 30 which travels at a selected speed through the oven. Burner assembly 70 supplies a flame which is apportioned to provide the desired amounts of thermal energy to the respective plenums 48a and 48b. Fans 52a and 52b provide air flow through plenums 48a and 48b through the respective upper and lower duct fingers 32a, 32b, 34a, and 34b, and the air returns to the rear of the oven through space 52 and along the outside walls of the oven.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A food preparation oven comprising a cooking chamber; a conveyor for supporting food products and for transporting said products through said chamber; a plurality of air impingement fingers disposed in said chamber for forming a plurality of columnated jets of air and for impinging said jets against discreet points of food products supported on said conveyor; a plurality of plenums operatively associated with said fingers; a plurality of fans operatively associated with said plurality of plenums for supplying air to said plurality of plenums; a single only burner operatively associated with said plurality of plenums and positioned to heat the air supplied to said plurality of plenums, said burner including an adjustable apportioning means for selectively apportioning the thermal energy supplied by said burner between said plurality of plenums.

2. The oven according to claim 1 wherein said apportioning means comprises a pivotable baffle, whereby the flame of said burner may be selectively deflected.

3. The oven according to claim 1 wherein said apportioning means comprises a bendable tab positioned to deflect the flame of said burner.

4. The oven according to claim 1 wherein said burner includes a flame deflecting means for generating a negative pressure zone and for directing said flame away from at least one wall of said oven.

5. The oven according to claim 4 wherein said flame directing means comprises a second baffle positioned forwardly of the flame of said burner in the return air stream returning from said chamber to said plenums.

6. The oven according to claim 1 wherein the flame of said burner exits from the burner intermediate said plenums.

7. The oven according to claim 1 wherein said burner includes a burner sleeve assembly, said burner sleeve assembly comprising a tubular member having an aperture at one end thereof from which the burner flame exits, said burner sleeve assembly including an end cap, said end cap including an upstanding planar baffle including a bending line whereby the angle of inclination of said baffle may be selectively varied by bending said baffle along said bending line.

8. The oven according to claim 7 and further including a fixed baffle secured to said tubular member forwardly of said aperture.

9. A food preparation oven comprising a cooking chamber; means disposed in said chamber for supporting a food product; a plurality of air impingement fingers disposed in said chamber for forming a plurality of columnated jets of air and for impinging said jets against discreet points of a food product supported on said support means; a plurality of plenums operatively associated with said plurality of fingers; an air moving means operatively associated with each of said plurality of plenums for supplying air thereto; and a single only burner operatively associated with said plurality of plenums for supplying thermal energy to the air supplied to said plenums, said burner including an adjustable burner baffle means for deflecting the flame of said burner, whereby the thermal energy supplied by said burner may be selectively apportioned between said plenums.

10. The oven according to claim 9 wherein said plurality of plenum means comprises two plenums, and wherein said air moving means comprises two fans, each said fans being respectively associated with one of said plenums, each of said plenums supplying air to a plurality of said fingers.

11. The oven according to claim 9 wherein said plurality of plenums comprises two plenums, and wherein the flame of said single only burner is arranged intermediate said two plenums for supplying heat energy to the air returning from said chamber to said two plenums.

12. The oven according to claim 9 wherein said burner baffle means comprises a planar pivotable member secured to said burner, said member being pivotable at a selected angle with respect to the longitudinal axis of said flame to deflect said flame and to apportion the thermal energy supplied by said burner between said plenums.

13. The oven according to claim 9 wherein said burner includes a directing baffle means for generating a negative pressure zone and for drawing the flame of said burner forwardly in said oven.

14. A food preparation apparatus comprising:
   a cooking chamber including a pair of openings in two opposite facing walls thereof;
   conveyor means disposed in said chamber for conveying a food product through said chambers, said conveyor means extending through said pair of openings;
   first and second pairs of impingement ducts for forming a plurality of columnated air jets and for impinging said jets against discreet points of a food product supported on said conveyor, a first one of each of said pairs of ducts disposed above said conveyor and a second one of each of said pairs of ducts disposed below said conveyor;
   first and second plenums respectively operatively associated with said first and second pairs of impingement ducts for supplying air thereto;
   first and second fans respectively operatively associated with said plenums; and
   a single only burner operatively associated with said first and second plenums for heating the air supplied to said impingement ducts, said burner including a first baffle for deflecting the flame of said burner to thereby apportion the thermal energy of said burner between said first and second plenums, said burner including a second baffle positioned in the path of return air flowing to said plenums, whereby a negative pressure zone is generated forwardly of the flame of said burner to draw said flame toward said zone.

15. The apparatus according to claim 14 wherein the first baffle is selectively adjustable to vary said apportioning of the thermal energy supplied by said burner.

16. The apparatus according to claim 14 wherein said burner includes a burner sleeve tube and wherein said first baffle comprises a bendable planar tab secured to said burner sleeve tube.

17. The apparatus according to claim 14 wherein said burner includes a burner sleeve tube and wherein said second baffle comprises a planar member secured to said burner sleeve tube, forwardly of the flame of said burner.

18. The apparatus according to claim 14 wherein the flame of the burner exits the burner intermediate the two plenums.

* * * * *